(12) United States Patent
Jung et al.

(10) Patent No.: US 12,388,129 B2
(45) Date of Patent: Aug. 12, 2025

(54) BATTERY MODULE AND BATTERY PACK INCLUDING THE SAME

(71) Applicant: LG ENERGY SOLUTION, LTD., Seoul (KR)

(72) Inventors: Kitaek Jung, Daejeon (KR); Sung Dae Kim, Daejeon (KR); Youngsun Yun, Daejeon (KR); Junkyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 181 days.

(21) Appl. No.: 17/768,704

(22) PCT Filed: Jul. 23, 2021

(86) PCT No.: PCT/KR2021/009520
§ 371 (c)(1),
(2) Date: Apr. 13, 2022

(87) PCT Pub. No.: WO2022/045594
PCT Pub. Date: Mar. 3, 2022

(65) Prior Publication Data
US 2024/0030512 A1 Jan. 25, 2024

(30) Foreign Application Priority Data
Aug. 26, 2020 (KR) .................. 10-2020-0107736

(51) Int. Cl.
*H01M 10/653* (2014.01)
*H01M 50/105* (2021.01)
(Continued)

(52) U.S. Cl.
CPC ....... *H01M 10/653* (2015.04); *H01M 50/105* (2021.01); *H01M 50/211* (2021.01);
(Continued)

(58) Field of Classification Search
CPC ............ H01M 10/653; H01M 50/231; H01M 50/227; H01M 50/105; H01M 50/593; H01M 50/588; H01M 50/211
See application file for complete search history.

(56) References Cited

U.S. PATENT DOCUMENTS

2005/0069759 A1 3/2005 Shimamura et al.
2012/0313559 A1 12/2012 Tonomura et al.
(Continued)

FOREIGN PATENT DOCUMENTS

CN 111052439 A 4/2020
CN 111373567 A 7/2020
(Continued)

OTHER PUBLICATIONS

KR 20200079774 MT (Year: 2020).*
(Continued)

*Primary Examiner* — Alexander Usyatinsky
(74) *Attorney, Agent, or Firm* — Birch, Stewart, Kolasch & Birch, LLP

(57) ABSTRACT

A battery module includes a battery cell stack in which a plurality of battery cells are stacked, a frame member for housing the battery cell stack and having an opened upper portion, and an upper plate for covering the battery cell stack on an upper portion of the frame member, wherein a stepped portion is formed at the bottom portion of the frame member corresponding to the upper plate, the stepped portion is formed in each of both end portions and between both end portions with respect to the longitudinal direction of the battery cell, and wherein the stepped portion is formed by a bending section of the bottom portion of the frame member.

20 Claims, 14 Drawing Sheets

(51) Int. Cl.
  *H01M 50/211* (2021.01)
  *H01M 50/227* (2021.01)
  *H01M 50/231* (2021.01)
  *H01M 50/588* (2021.01)
  *H01M 50/593* (2021.01)

(52) U.S. Cl.
  CPC ....... *H01M 50/227* (2021.01); *H01M 50/231* (2021.01); *H01M 50/588* (2021.01); *H01M 50/593* (2021.01)

(56) References Cited

U.S. PATENT DOCUMENTS

| | | | |
|---|---|---|---|
| 2013/0224524 A1* | 8/2013 | Nam ................ | H01M 50/211 429/7 |
| 2017/0190264 A1* | 7/2017 | Kim ................ | H01M 50/242 |
| 2018/0019508 A1 | 1/2018 | Lee et al. | |
| 2018/0138559 A1 | 5/2018 | Omura | |
| 2018/0316070 A1 | 11/2018 | Lee et al. | |
| 2019/0131596 A1* | 5/2019 | Yang ................ | H01M 50/224 |
| 2019/0198952 A1 | 6/2019 | Choi et al. | |
| 2020/0067040 A1 | 2/2020 | Kim et al. | |
| 2020/0350530 A1* | 11/2020 | Kim ................ | H01M 50/262 |
| 2021/0036277 A1* | 2/2021 | Seo ................ | H01M 10/0481 |
| 2021/0226291 A1 | 7/2021 | Kim et al. | |
| 2022/0037710 A1 | 2/2022 | Yoon et al. | |
| 2022/0052391 A1 | 2/2022 | Kim et al. | |
| 2023/0047201 A1 | 2/2023 | Seo et al. | |
| 2023/0109938 A1 | 4/2023 | Shin et al. | |

FOREIGN PATENT DOCUMENTS

| | | | |
|---|---|---|---|
| CN | 211320165 U | 8/2020 | |
| CN | 113795972 A | 12/2021 | |
| EP | 3 694 017 A1 | 8/2020 | |
| EP | 3 876 303 B1 | 4/2023 | |
| JP | 7-323735 A | 12/1995 | |
| JP | 5776345 B2 | 9/2015 | |
| JP | 2019-508870 A | 3/2019 | |
| JP | 2019-186040 A | 10/2019 | |
| JP | 2020-522855 A | 7/2020 | |
| JP | 2005-129487 A | 6/2025 | |
| JP | 2018-502431 A | 6/2025 | |
| KR | 10-2017-0082041 A | 7/2017 | |
| KR | 10-2019-0078521 A | 7/2019 | |
| KR | 10-2019-0106060 A | 9/2019 | |
| KR | 20190106060 A * | 9/2019 | |
| KR | 10-2020-0008624 A | 1/2020 | |
| KR | 10-2061745 B1 | 1/2020 | |
| KR | 10-2020-0021609 A | 3/2020 | |
| KR | 10-2020-0079774 A | 7/2020 | |
| KR | 10-2128588 B1 | 7/2020 | |
| KR | 20200079774 A * | 7/2020 | |
| WO | WO 2016/174855 A1 | 11/2016 | |
| WO | WO-2019117449 A1 * | 6/2019 | .......... H01M 10/613 |
| WO | WO 2020/166998 A1 | 8/2020 | |

OTHER PUBLICATIONS

The decision of JPO to grant a Patent for Application No. 2022522364 (Year: 2024).*

International Search Report for PCT/KR2021/009520 mailed on Nov. 9, 2021.

Extended European Search Report dated Jul. 17, 2023 for Application No. 21861893.2.

* cited by examiner

[FIG. 1]
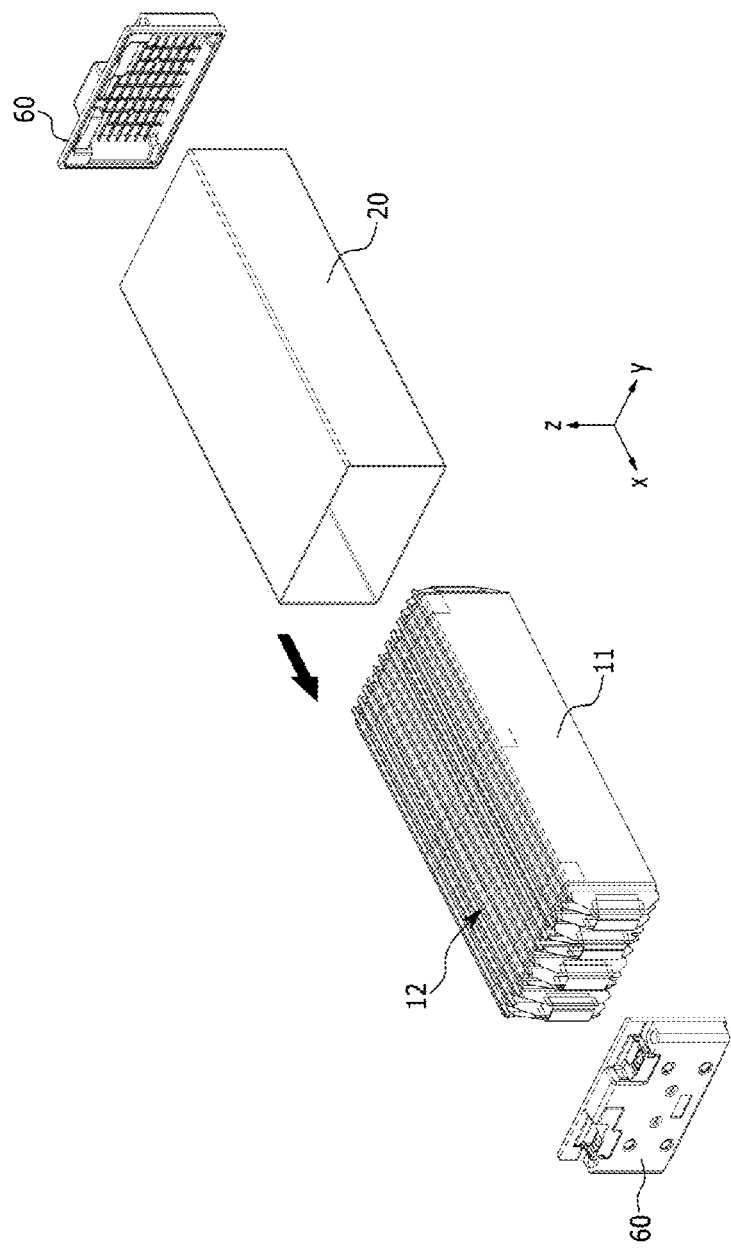
Related Art

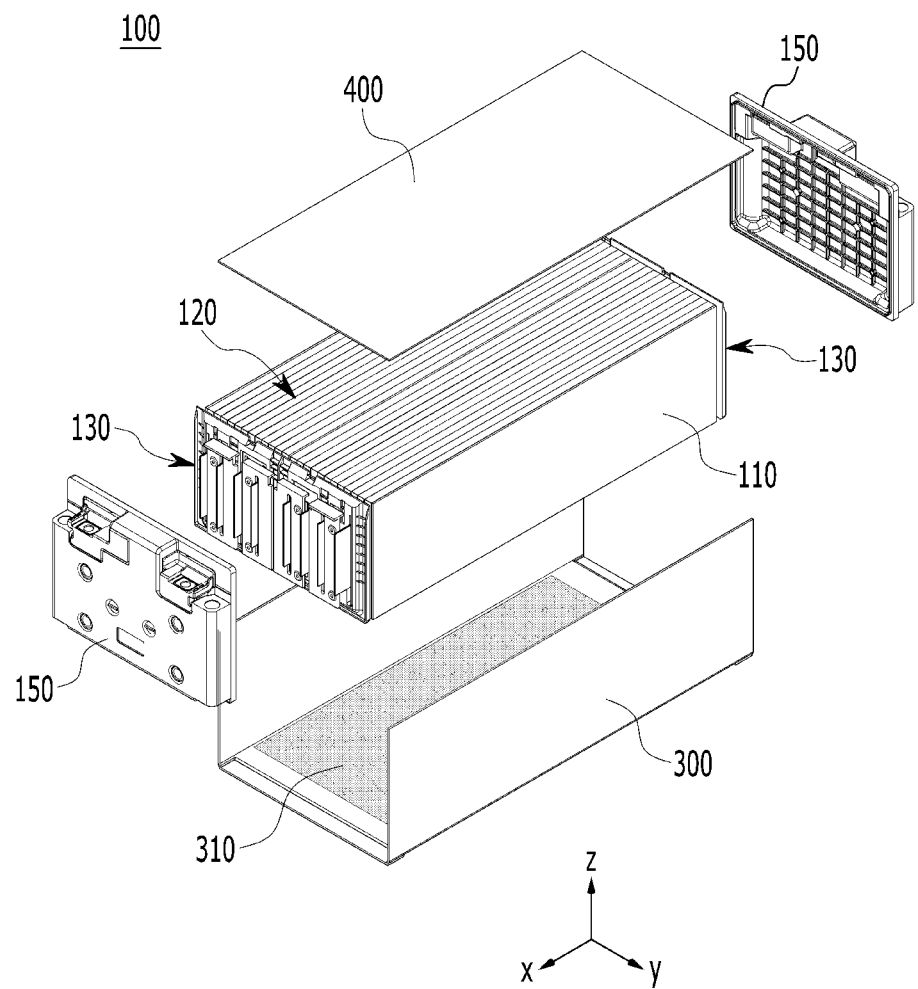
[FIG. 2]

[FIG. 3]
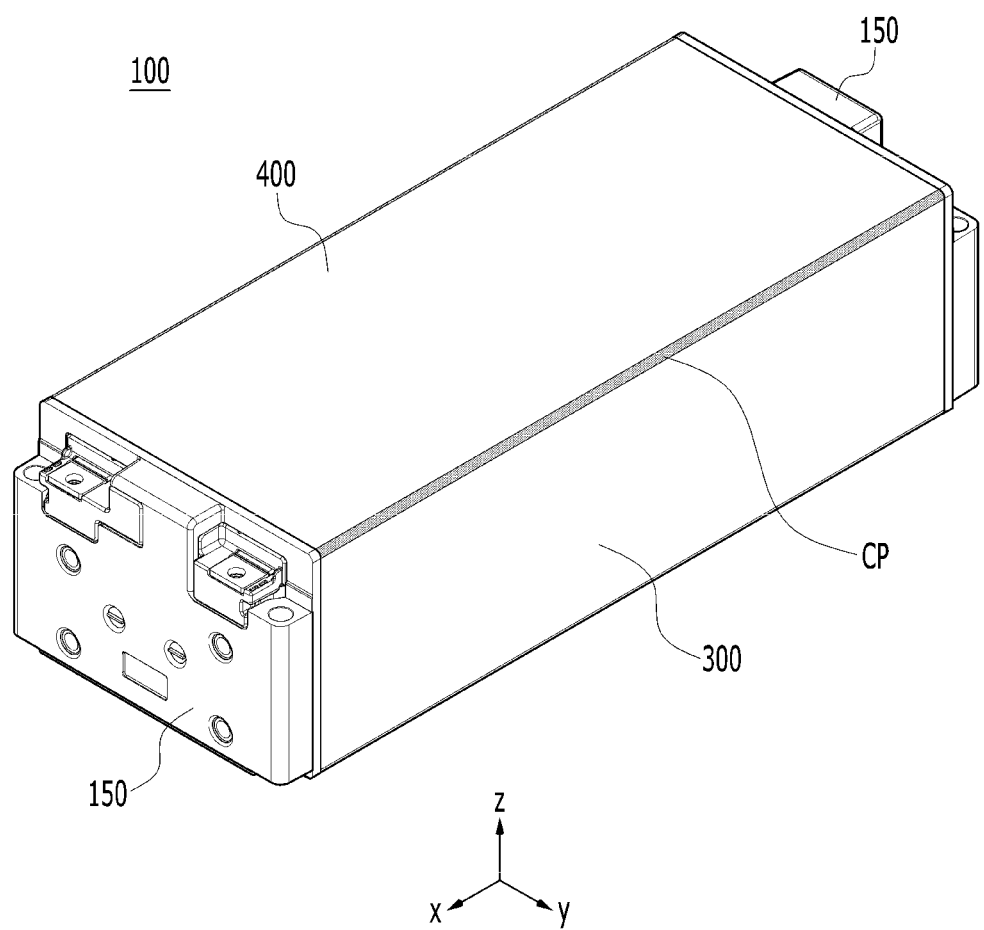

[FIG. 4]
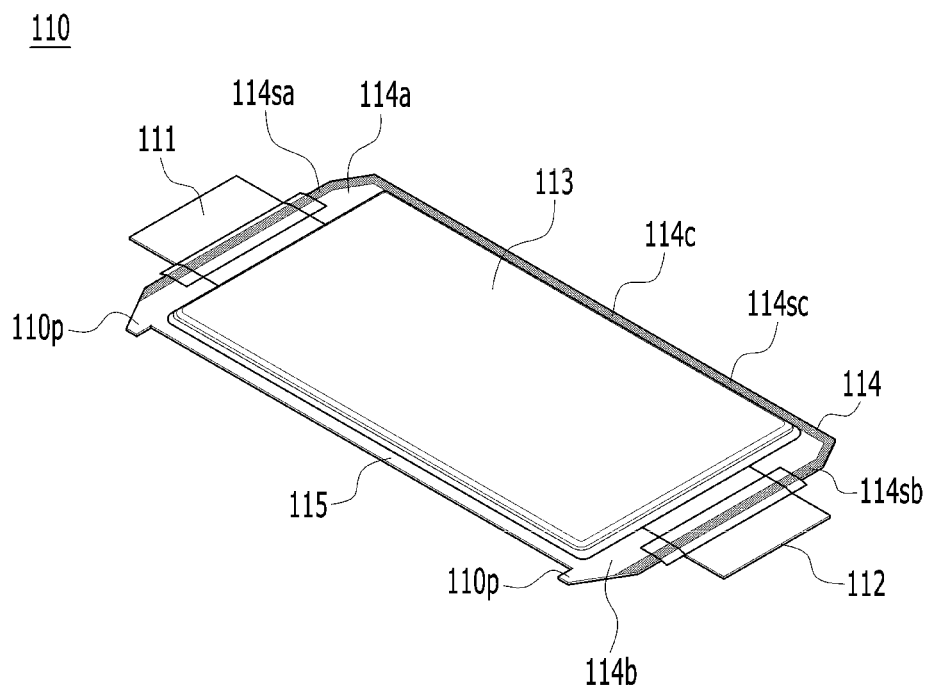

[FIG. 5]
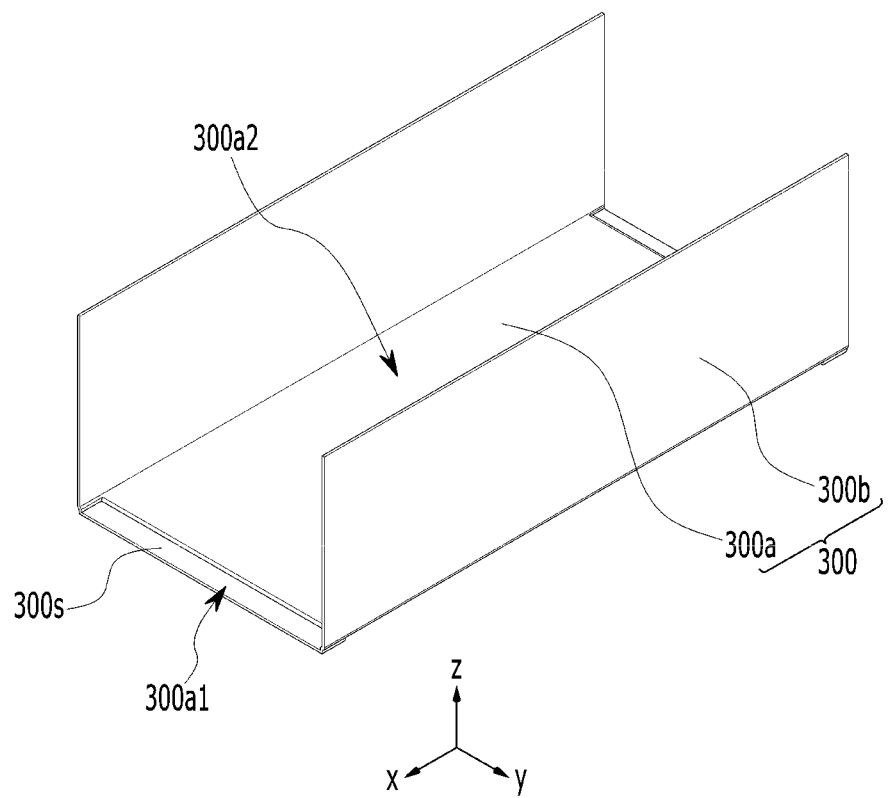

[FIG. 6]
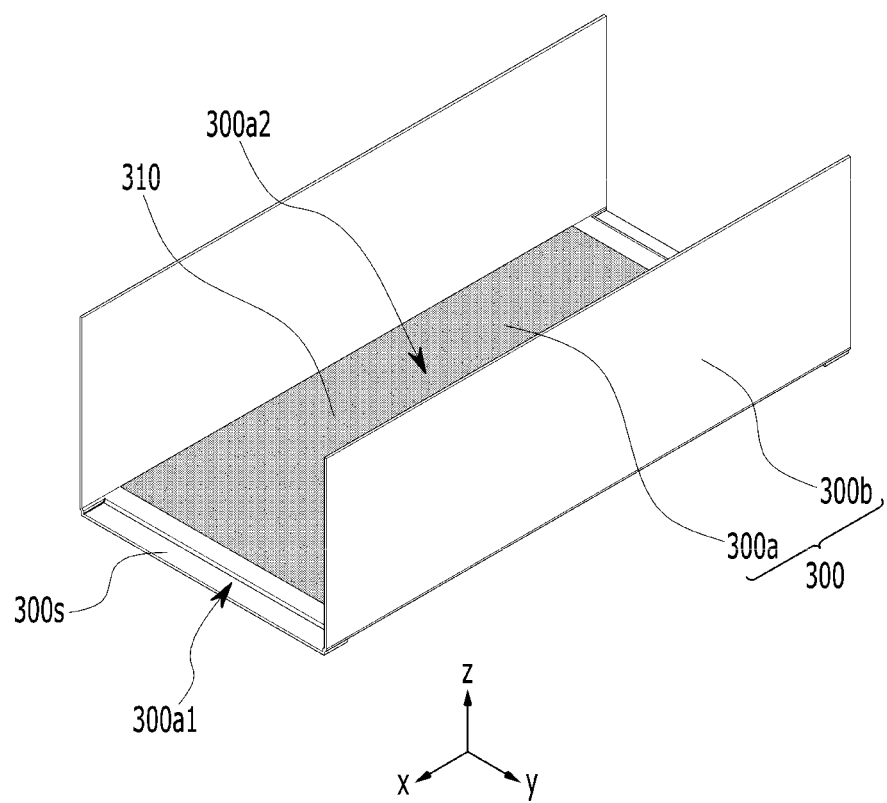

[FIG. 7]
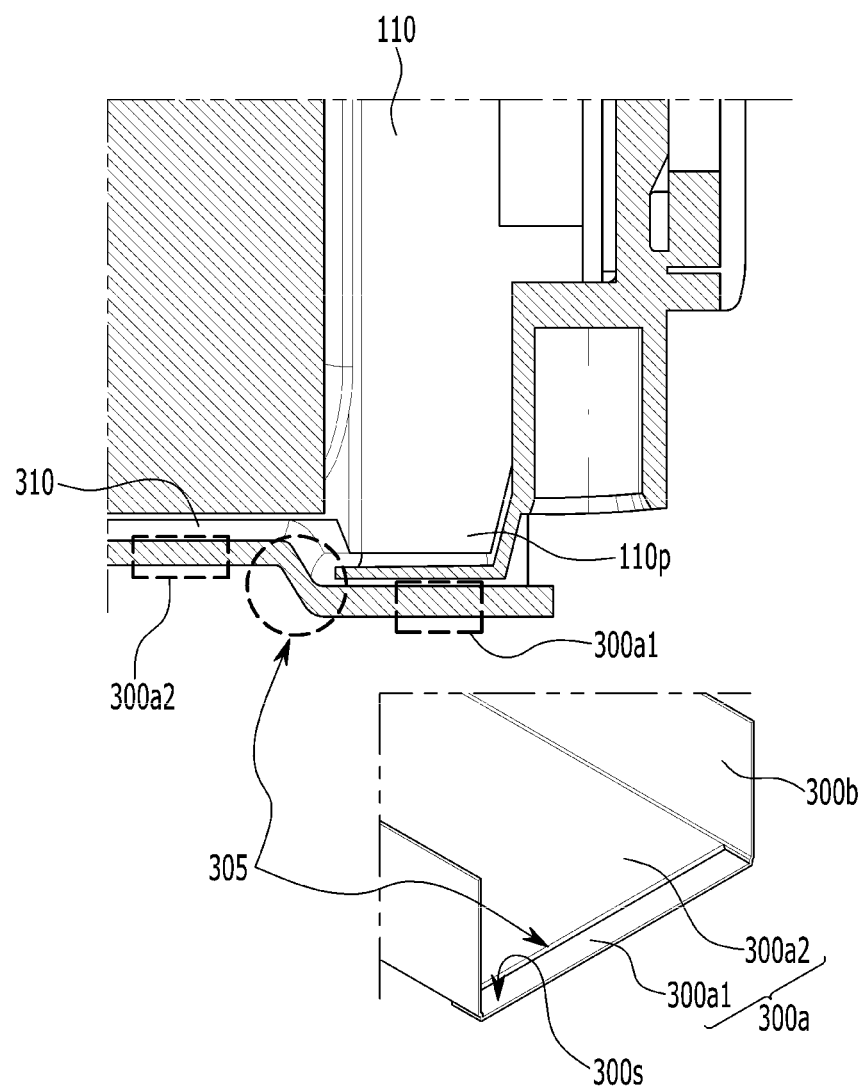

[FIG. 8]
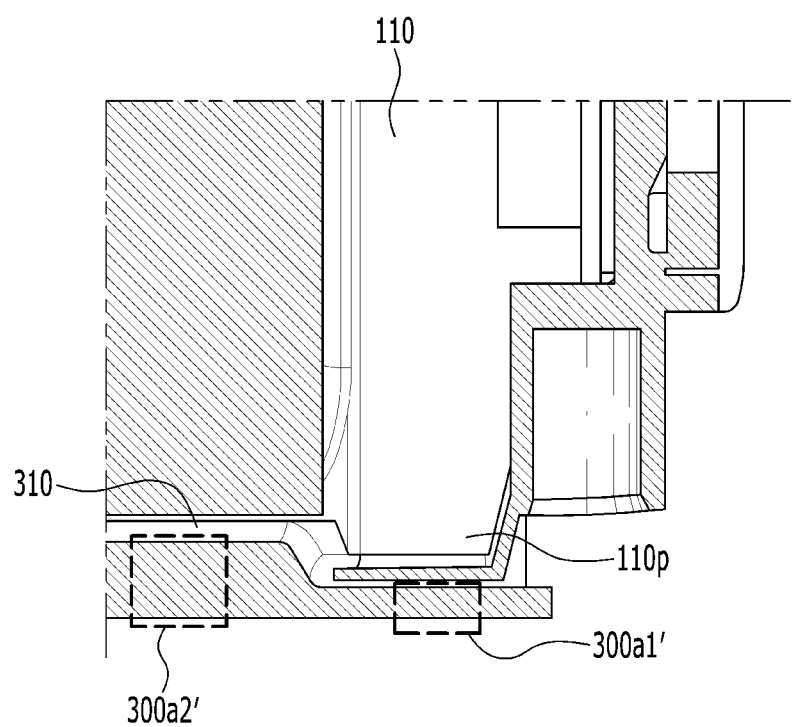

[FIG. 9]
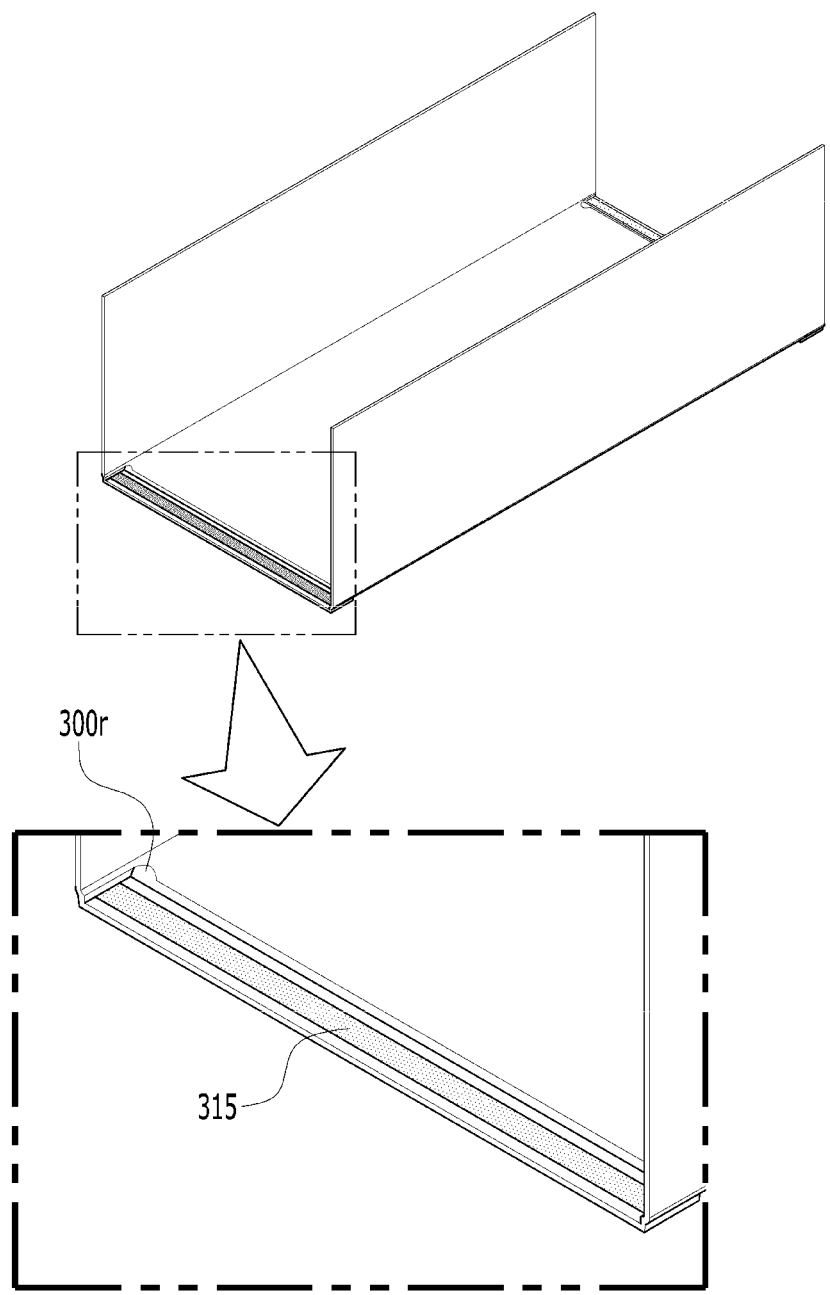

【FIG. 10】
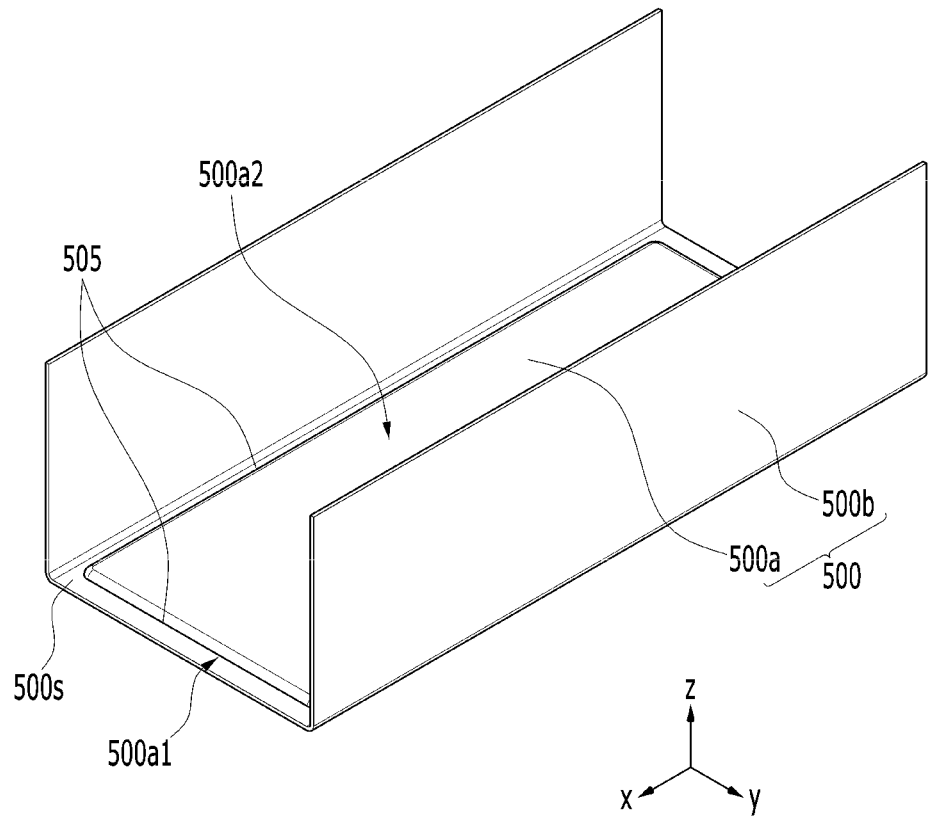
【FIG. 11】
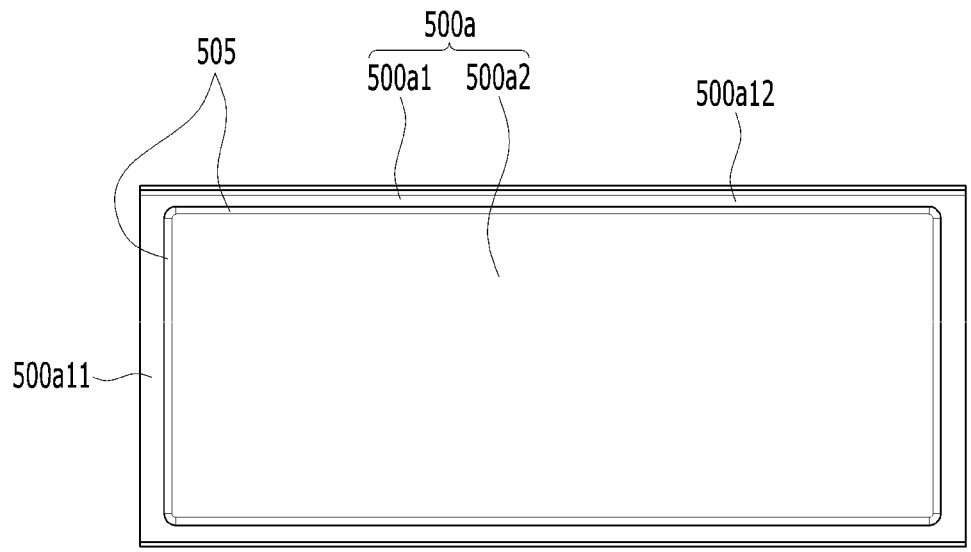

[FIG. 12]
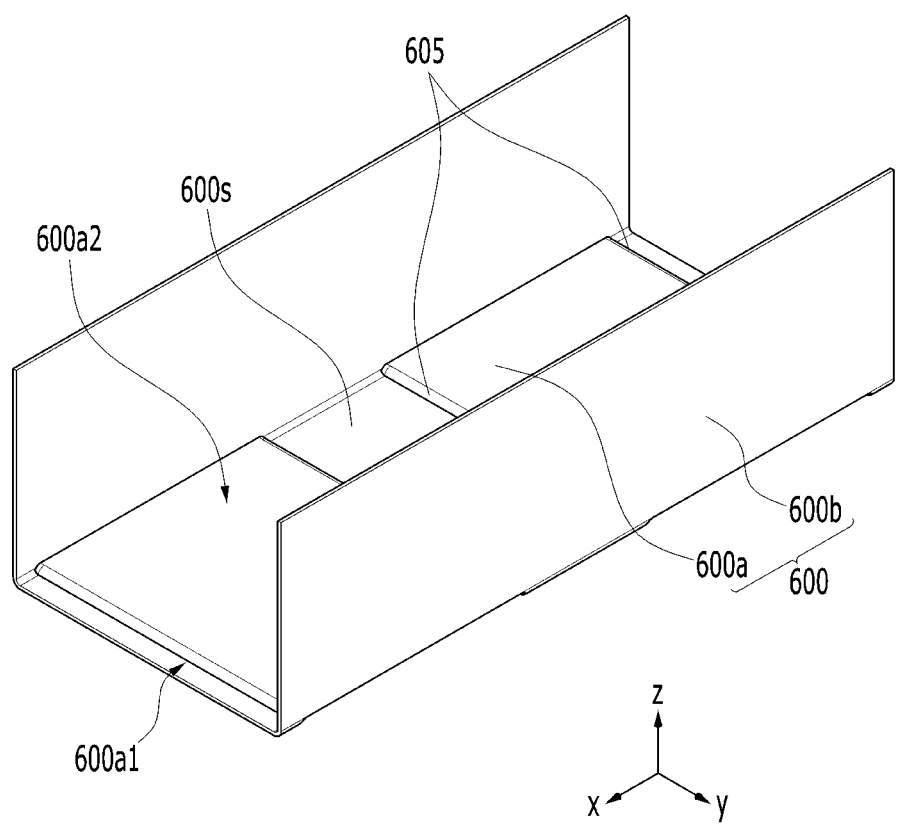

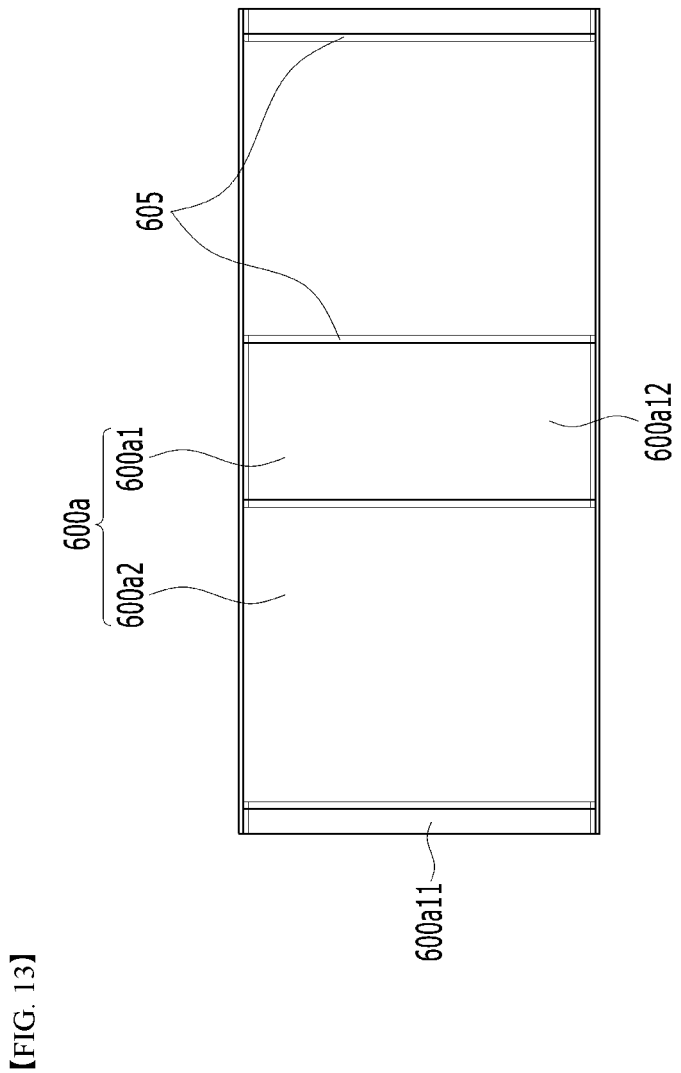
[FIG. 13]

[FIG. 14]
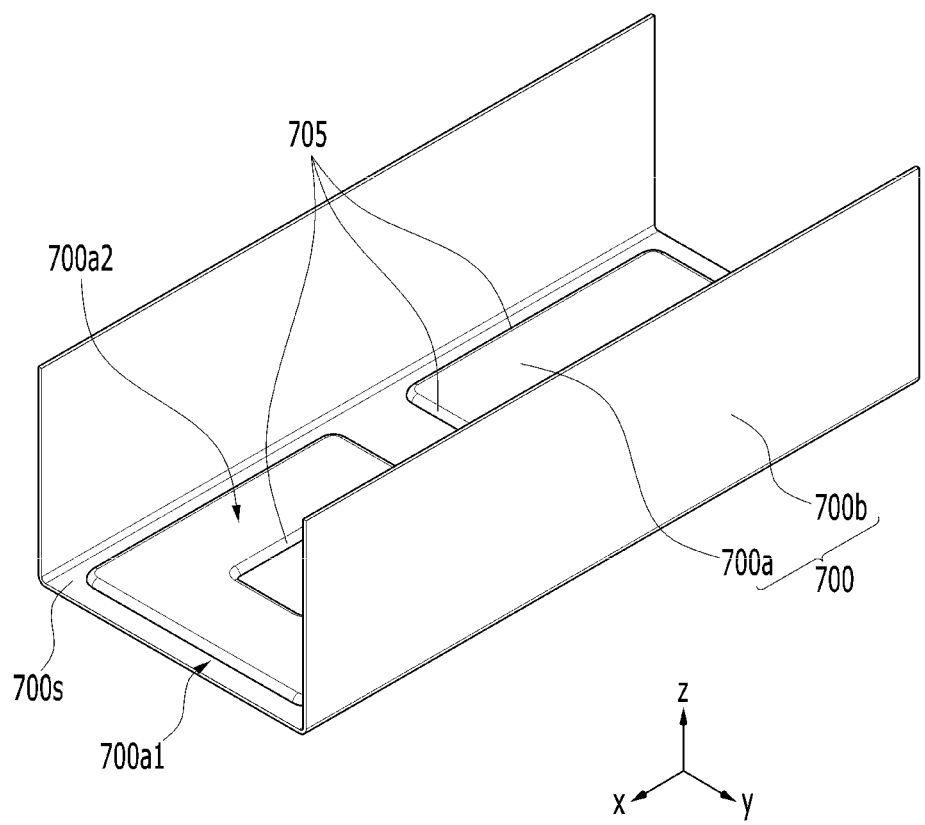

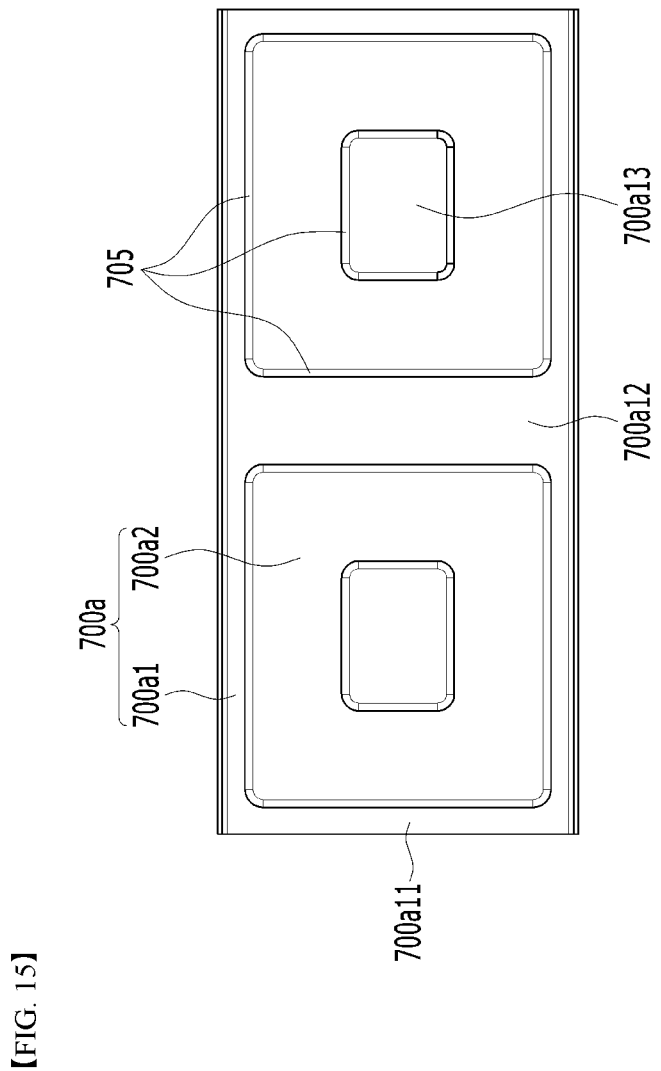
[FIG. 15]

BATTERY MODULE AND BATTERY PACK INCLUDING THE SAME

TECHNICAL FIELD

Cross Citation with Related Application(s)

This application claims the benefit of Korean Patent Application No. 10-2020-0107736 filed on Aug. 26, 2020 with the Korean Intellectual Property Office, the disclosure of which is incorporated herein by reference in its entirety.

The present disclosure relates to a battery module and a battery pack including the same, and more particularly, to a battery module that improves the space utilization rate and minimizes the use amount of thermal conductive resin and a battery pack including the same.

BACKGROUND

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Therefore, a prismatic battery, a pouch-shaped battery or the like, which can be stacked with high integration and has a small weight relative to capacity, is usually used as a battery cell of the middle or large-sized battery module. Meanwhile, in order to protect the battery cell stack from external impact, heat or vibration, the battery module may include a module frame of which a front surface and a rear surface are opened so as to house the battery cell stack in an internal space.

FIG. 1 is an exploded perspective view illustrating a battery module having a mono frame according to the related art.

Referring to FIG. 1, a battery module may include a battery cell stack 12 formed by stacking a plurality of battery cells 11, a mono frame 20 of which a front surface and a rear surface are opened so as to cover the battery cell stack 12, and end plates 60 that cover the front and rear surfaces of the mono frame 20. In order to form such a battery module, it is necessary to horizontally assemble the battery module such that the battery cell stack 12 is inserted into the opened front surface or rear surface of the mono frame 20 along the X-axis direction as shown by the arrow in FIG. 1. However, in order to stably perform such a horizontal assembly, a sufficient clearance has to be secured between the battery cell stack 12 and the mono frame 20. Here, the clearance refers to a gap generated by press-fitting and the like.

A thermal conductive resin layer (not shown) may be formed between the battery cell stack 12 and the bottom portion of the mono frame 20. The thermal conductive resin layer can play a role of transferring the heat generated from the battery cell stack to the outside of the battery module, and fixing the battery cell stack inside the battery module. When the clearance becomes larger, the use amount of the thermal conductive resin layer may become larger than necessary.

In addition, the height of the mono frame 20 should be designed large in consideration of the maximum height of the battery cell stack 12 and an assembly tolerance during the insertion process, and the like, which may lead to generation of unnecessary wasted space.

DETAILED DESCRIPTION OF THE INVENTION

Technical Problem

It is an object of the present disclosure to provide a battery module that improves the space utilization rate and minimizes the use amount of thermal conductive resin by deforming the structure of the frame member surrounding the battery cell stack, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked in a first direction, a frame member for housing the battery cell stack and having an opened upper portion, and an upper plate for covering the battery cell stack on an upper portion of the frame member, wherein a stepped portion is formed at a bottom portion of the frame member, wherein the stepped portion is formed in each end portion of the bottom portion of the frame member, and wherein each stepped portion is formed by a bending section of the bottom portion of the frame member.

Each battery cell of the plurality of battery cells may include a protrusion portion that protrudes toward the stepped portion formed on at least one end portion of the battery cell.

The bottom portion of the frame member may include an edge portion and a main portion surrounded by the edge portion, the edge portion may include a first portion located at an edge of the bottom portion based on a second direction, and a second portion located at an edge of the bottom portion based on the first direction, and the edge portion corresponds to the stepped portion, and the thicknesses of the edge portion and the main portion may be equal to each other.

The battery module may further comprise a thermal conductive resin layer between the bottom portion of the frame member and the battery cell stack in the region corresponding to the main portion.

The bottom portion of the frame member may include a concave portion and convex portions, the concave portion may include a first portion located at an edge with respect to the second direction, and a second portion located at the central portion with respect to the second direction, the second portion of the concave portion is located between adjacent convex portions, and the concave portion may correspond to the stepped portion, and the thicknesses of the concave portion and the convex portions are equal to each other.

The battery module may further include a thermal conductive resin layer that is located between the bottom portion of the frame member and the battery cell stack in a region corresponding to the convex portions.

The thermal conductive resin layer may include a first thermal conductive resin layer and a second thermal conductive resin layer that are spaced apart from each other with respect to the second portion of the concave portion.

The bottom portion of the frame member may include a concave portion and a convex portion, the concave portion may include a first portion corresponding to an edge of the bottom portion, a second portion located in the central portion with respect to the longitudinal direction of the battery cell, and a third portion, a third portion of the concave portion may be formed in a middle of the convex portion, the concave portion may corresponds to the stepped portion, and the thicknesses of the concave portion and the convex portion may be equal to each other.

The battery module may further include a thermal conductive resin layer that is located between the bottom portion of the frame member and the battery cell stack in a region corresponding to the convex portion and the third portion of the concave portion.

The battery module may further include an insulating sheet located between the stepped portion and the protrusion portion of the battery cell.

The insulating sheet may be formed of polyethylene terephthalate (PET).

The protrusion portion may be formed in a height direction of the battery cell.

The battery module may further include end plates coupled to the opposite sides of the frame member, respectively, wherein the opposite sides of the frame member face each other with respect to t the second direction.

The frame member may further include two side surface portions facing each other while being connected by the bottom portion, and a distance between the two side surface portions may be equal to a width of the upper plate.

According to another embodiment of the present disclosure, there is provided a battery pack comprising the above-mentioned battery module.

Advantageous Effects

According to embodiments of the present disclosure, the bottom portion of the frame member can be press-molded to reduce the gap between the battery cell stack and the frame member, thereby improving the space utilization in the height direction and minimizing the amount of application of the thermal conductive resin.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view illustrating a battery module having a mono frame according to the related art;

FIG. 2 is an exploded perspective view illustrating a battery module according to an embodiment of the present disclosure;

FIG. 3 is a perspective view illustrating a state in which components constituting the battery module of FIG. 2 are combined;

FIG. 4 is a perspective view illustrating a pouch-type battery according to an embodiment of the present disclosure;

FIG. 5 is a perspective view illustrating a frame member in the battery module of FIG. 2;

FIG. 6 is a perspective view illustrating a thermal conductive resin layer formed on a bottom portion of a frame member in FIG. 5;

FIG. 7 is a view illustrating a part of a cross-section taken along the XZ plane of FIG. 3;

FIG. 8 is a cross-sectional view according to the comparative example of FIG. 7;

FIG. 9 is a perspective view illustrating an insulating sheet included in a battery module according to another embodiment of the present disclosure;

FIG. 10 is a perspective view illustrating a frame member according to another embodiment of the present disclosure;

FIG. 11 is a plan view of the frame member of FIG. 10;

FIG. 12 is a perspective view illustrating a frame member according to another embodiment of the present disclosure;

FIG. 13 is a plan view of the frame member of FIG. 12;

FIG. 14 is a perspective view illustrating a frame member according to another embodiment of the present disclosure; and FIG. 15 is a plan view of the frame member of FIG. 14.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is an exploded perspective view illustrating a battery module according to an embodiment of the present disclosure. FIG. 3 is a perspective view illustrating a state in which components constituting the battery module of FIG. 2 are combined. FIG. 4 is a perspective view illustrating a pouch-type battery according to an embodiment of the present disclosure.

Referring to FIGS. 2 and 3, a battery module 100 according to the present embodiment includes a battery cell stack 120 containing a plurality of battery cells 110, a frame member 300 of which an upper surface, a front surface and a rear surface are opened, an upper plate 400 that covers the upper portion of the battery cell stack 120, end plates 150 each locating on the front surface and the rear surface of the battery cell stack 120, and a busbar frame 130 located between the battery cell stack 120 and the end plate 150.

When opened both sides of the frame member 300 are referred to as a first side and a second side, respectively, the frame member 300 has a plate-shaped structure that is bent so as to continuously wrap the front surface, lower surface and rear surface adjacent to each other among the remaining outer surfaces excluding surfaces of the battery cell stack 120 corresponding to the first side and the second side. The upper surface corresponding to the lower surface of the frame member 300 is opened. The front surface, bottom surface and rear surface of the frame member 300 may be integrally formed.

The upper plate 400 is constituted of a single plate-shaped structure that wraps the remaining upper surface excluding the front surface, lower surface and rear surface which are wrapped by the frame member 300. The frame member 300 and the upper plate 400 can be coupled by welding or the like in a state in which the corresponding corner areas are in contact with each other, thereby forming a structure wrapping the battery cell stack 120. That is, the frame member 300 and the upper plate 400 can have a coupling part CP formed at a corner area corresponding to each other by a coupling method such as welding.

The battery cell stack 120 includes a plurality of battery cells 110 stacked in one direction, and the plurality of battery cells 110 may be stacked in the Y-axis direction as shown in FIG. 2. The battery cell 110 is preferably a pouch-type battery cell. For example, referring to FIG. 4, the battery cell 110 according to the present embodiment may have a structure in which the two electrode leads 111 and 112 are protruded from one end portion 114a and the other end portion 114b of the battery body 113, while being opposite to each other. The battery cell 110 can be manufactured by coupling both end portions 114a and 114b of a cell case 114 and one side portion 114c connecting them in a state in which an electrode assembly (not shown) is housed in the cell case 114. In other words, the battery cell 110 according to the present embodiment has a total of three sealing parts 114sa, 114sb and 114sc, and the sealing parts 114sa, 114sb and 114sc have a structure being sealed by a method such as heat fusion, and the remaining other one side portion may be formed of a connection part 115. Between both end portions 114a and 114b of the battery case 114 is defined as a longitudinal direction of the battery cell 110, and between the one side portion 114c and the connection part 115 that connect both end portions 114a and 114b of the battery case 114 is defined as a height direction of the battery cell 110.

The connection part 115 is a region extending long along one edge of the battery cell 110, and a protrusion portion 110p of the battery cell 110 may be formed at an end portion of the connection part 115. The protrusion portion 110p may be formed on at least one of both end portions of the connection part 115 and may protrude in a direction perpendicular to the direction in which the connection part 115 extends. The protrusion portion 110p may be located between one of the sealing parts 114sa and 114sb of both end portions 114a and 114b of the battery case 114, and the connection part 115.

The battery case 114 is generally formed of a laminate structure of a resin layer/metallic thin film layer/resin layer. For example, in case where the battery case surface is formed of an O(oriented)-nylon layer, it tends to slide easily by an external impact when a plurality of battery cells are stacked to form a medium or large-sized battery module. Therefore, in order to prevent this sliding and maintain a stable stacked structure of the battery cells, an adhesive member, for example, a sticky adhesive such as a double-sided tape or a chemical adhesive coupled by a chemical reaction upon adhesion can be adhered to the surface of the battery case to form the battery cell stack 120. In the present embodiment, the battery cell stack 120 is stacked in a Y-axis direction and housed into the frame member 300 in a Z-axis direction, and then heat transfer can be performed by a heat conductive resin layer described later. As a comparative example thereto, there is a case where the battery cells are formed as cartridge-shaped components so that fixing between the battery cells is constituted by assembling by the battery module frame. In this comparative example, due to the presence of the cartridge-shaped components, the cooling action may be little or be proceeded in a surface direction of the battery cells, whereby the cooling is not performed in the height direction of the battery module.

FIG. 5 is a perspective view illustrating a frame member in the battery module of FIG. 2. FIG. 6 is a perspective view illustrating a thermal conductive resin layer formed on a bottom portion of a frame member in FIG. 5.

Referring to FIG. 5, the frame member 300 according to the present embodiment includes a bottom portion 300a and two side surface portions 300b facing each other. Before the battery cell stack 120 is mounted on the bottom portion 300a of the frame member 300, a thermal conductive resin is applied onto the bottom portion of the frame member 300 and the thermally conductive resin is cured, thereby capable of forming a thermal conductive resin layer 310.

Before the thermal conductive resin layer 310 is formed, that is, before the applied thermal conductive resin is cured, the battery cell stack 120 may be mounted on the bottom portion 300a of the module frame 300 while moving along in a direction that is perpendicular to the bottom portion 300a of the module frame 300. Thereafter, the thermal conductive resin layer 310 that is formed by the curing of the thermal conductive resin is located between the bottom portion 300a of the module frame 300 and the battery cell stack 120. Referring to FIGS. 2 and 6, the thermal conductive resin layer 310 can perform the role of transferring the heat generated from the battery cells 110 to a bottom of the battery module 100, and fixing the battery cell stack 120.

The bottom portion 300a of the frame member 300 according to the present embodiment includes a first portion 300a1 and a second portion 300a2, the first portion 300a1 is located at the edge with respect to the longitudinal direction of the battery cell 110, and the second portion 300a2 is located at the inside of the first portion 300a1. The thermal conductive resin layer 310 may be formed on the second portion 300a2. Here, the longitudinal direction of the battery cell 110 may be the X-axis direction of FIG. 5. At this time, the thickness of the first portion 300a1 is equal to the thickness of the second portion 300a2, the portion of the bottom portion 300a to which the second portion 300a2 and the first portion 300a1 are connected can be bent, and a stepped portion 300s is formed in a region corresponding to the first portion 300a1. Here, the stepped portion refers to a structure resulting from a difference in height from the periphery.

The stepped portion 300s may be formed by press-molding the bottom portion 300a of the frame member 300. As will be described later, the battery cell stack 120 is mounted on the bottom portion 300a of the frame member 300 so that the protrusion portion 110p of the battery cell 110 according to the present embodiment protrudes toward the stepped portion 300s.

Referring back to FIGS. 2 and 3, the width of the side surface portion 300b and the upper plate 400 of the frame member 300 according to the present embodiment may be equal to each other. In other words, the edge portion along the X-axis direction of the upper plate 400 and the edge portion along the X-axis direction of the side surface portion 300b of the frame member 300 can be directly met and coupled by a method such as welding.

FIG. 7 is a view illustrating a part of a cross-section taken along the XZ plane of FIG. 3.

Referring to FIGS. 3 and 7, the battery module 100 according to the present embodiment includes a bottom portion of the frame member 300 having a first portion 300a1 and a second portion 300a2. The thicknesses of the first portion 300a1 and the second portion 300a2 are equal to each other, and the first portion 300a1 and the second portion 300a2 are connected to each other by the bending part 305. The second portion 300a2 is located at a higher level than the first portion 300a1. The protrusion portion 110p of the battery cell 110 is protruded toward the stepped portion 300s formed in the first portion 300a1. Therefore, it is possible to prevent the protrusion portion 110p from hanging on the step difference between the first portion 300a1 and the second portion 300a2 and flowing due to an external impact. In addition, by press-molding the bottom portion 300a of the frame member 300, the gap between the battery cell 110 and the frame member can be reduced, and the gap reducing effect causes a synergistic action with the gap reducing effect that can be obtained through height direction assembly, thereby maximizing the overall space efficiency. In addition, the protrusion portion 110p of the battery cell 110 is formed in the stepped portion 300s, whereby the separation distance between the battery cell 110 and the bottom portion 300a of the frame member 300 is minimized, which not only reduces the space efficiency, but also reduces the use amount of thermal conductive resin to form a thermal conductive resin layer, thereby reducing the costs. Therefore, the cooling efficiency can also be improved.

FIG. 8 is a cross-sectional view according to the comparative example of FIG. 7.

Referring to FIG. 8, in the comparative example of FIG. 8, the bottom portion of the frame member can form a stepped portion by processing the edge of the bottom portion of the frame member or press-compressing the edge of the bottom portion of the frame member. At this time, the bottom portion of the frame member includes a first portion 300a1' and a second portion 300a2' having different thicknesses from each other. In the case of this comparative example, the thickness of the bottom portion of the frame member corresponding to the second portion 300a2' can be increased to form the stepped portion. On the other hand, in the battery module according to the embodiment of FIG. 7, since the thickness of the frame bottom portion can be reduced by forming the stepped portion 300s through press molding, it can be designed for reducing the height of the case of the battery pack in which the battery module is mounted.

FIG. 9 is a perspective view illustrating an insulating sheet included in a battery module according to another embodiment of the present disclosure.

Referring to FIGS. 6, 7 and 9, the battery module according to the present embodiment may further include an insulating sheet 315 formed on the stepped portion 300s. The insulating sheet 315 may be formed of polyethylene terephthalate (PET), and may be located between the protrusion portion 110p and the stepped portion 300s of the battery cell 110 described above. The insulating sheet 315 functions to electrically insulate between the protrusion portion 110p of the battery cell 110 and the bottom portion 300a of the frame member. At this time, the insulating sheet 315 can come into contact with the protrusion portion 110p of the battery cell 110. Further, an undercut shape 300r may be formed in the stepped portion 300s. The undercut shape 300r may have a round shape. The shape of the insulating sheet 315 may be simplified by the undercut shape 300r formed in the stepped portion 300s. That is, the insulating sheet 315 can be applied only to the inside of the press-molded portion, and the corners of the insulating sheet 315 adjacent to the undercut shape 300r can be simplified and formed into a right angle.

FIG. 10 is a perspective view illustrating a frame member according to another embodiment of the present disclosure. FIG. 11 is a plan view of the frame member of FIG. 10.

Referring to FIGS. 2, 10 and 11, the frame member 500 according to the present embodiment includes a bottom portion 500a and two side surface portions 500b facing each other.

The bottom portion 500a of the frame member 500 according to the present embodiment includes an edge portion 500a1 and a main portion 500a2. The edge portion 500a1 includes a first portion 500a11 located at the edge with respect to the longitudinal direction of the battery cell 110 and a second portion 500a12 located at the edge with respect to the width direction of the battery cell 110. The second part 500a12 of the edge portion 500a1 is formed between the main portion 500a2 and the side portion 500b of the frame member 500.

The main portion 500a2 may be surrounded by the edge portion 500a1. The thermal conductive resin layer 310 may be formed in a region corresponding to the main portion 500a2. Here, the longitudinal direction of the battery cell 110 is the x-axis direction of FIG. 5, and the width direction of the battery cell 110 may be the y-axis direction of FIG. 5. At this time, the thickness of the edge portion 500a1 is equal to the thickness of the main portion 500a2, and the portion of the bottom portion 500a where the main portion 500a2 and the edge portion 500a1 are connected is bent, so that a stepped portion 500s can be formed in a region corresponding to the edge portion 500a1. Here, the stepped portion refers to a structure resulting from a difference in height from the periphery. The edge portion 500a1 and the main portion 500a2 are connected by the bending portion 505. The main portion 500a2 is located at a higher level than the edge portion 500a1. The protrusion portion 110p of the battery cell 110 protrudes toward the stepped portion 500s formed in the first portion 500a11 of the edge portion 500a1.

The stepped portion 500s can be formed by press-molding the bottom portion 500a of the frame member 500. The battery cell stack 120 is mounted on the bottom portion 500a of the frame member 500 so that the protrusion portion 110p of the battery cell 110 according to the present embodiment protrudes toward the first portion 500a11 of the bottom portion 500a among the stepped portion 500s.

The frame member 500 of FIGS. 10 and 11 is a modified example of the frame member 300 to described in FIG. 5. In addition to the differences described above, all the contents described with reference to FIG. 5 can be applied to the present embodiment. In the case of the frame member 300 described with reference to FIG. 5, the sagging may occur in the central portion of the bottom portion 300a with respect to the longitudinal direction of the battery cell 110. Due to such sagging, an air gap may be formed between the thermal conductive resin layer 310 and the battery cell 110 of FIG. 2, or an external force generated by the sagging may be applied to the battery cell 110 to damage the battery cell 110. On the other hand, according to the present embodiment, the second portion 500a12 of the edge portion 500a1 is formed between the main portion 500a2 and the side surface portion 500b of the frame member 500, thereby capable of preventing the sagging along the longitudinal direction of the battery cell 110. In addition, the structural rigidity can be further improved by press-forming on the second portion 500a12 of the edge portion 500a1.

FIG. 12 is a perspective view illustrating a frame member according to another embodiment of the present disclosure. FIG. 13 is a plan view of the frame member of FIG. 12.

Referring to FIGS. 2, 12 and 13, the frame member 600 according to the present embodiment includes a bottom portion 600a and two side surface portions 600b facing each other.

The bottom portion 600a of the frame member 600 according to the present embodiment includes a concave portion 600a1 and a convex portion 600a2. The concave portion 600a1 includes a first portion 600a11 located at the edge of the battery cell 110 with respect to the longitudinal direction, and a second portion 600a12 located at the central portion with respect to the longitudinal direction of the battery cell 110. The convex portions 600a2 may be formed by a plurality of numbers. The second portion 600a12 of the concave portion 600a1 is formed between the convex portions 600a2 adjacent to each other.

The thermal conductive resin layer 310 may be formed on the convex portion 600a2. Although not shown, the thermal conductive resin layer 310 may include a first thermal conductive resin layer and a second thermal conductive resin layer that are located to be spaced apart from the second portion 600a12 of the concave portion 600a1. At this time, an additional insulating sheet may be formed in the second portion 600a12 of the concave portion 600a1.

In a modified example, the thermal conductive resin layer 310 may be formed so as to extend to the second portion 600a12 of the concave portion 600a1.

Here, the longitudinal direction of the battery cell 110 may be the x-axis direction of FIG. 5. At this time, the thickness of the concave portion 600a1 is equal to the thickness of the convex portion 600a2, and a portion of the bottom portion 600a connected to the convex portion 600a2 and the concave portion 600a1 may be bent, so that a stepped portion 600s can be formed in a region corresponding to the second portion 600a12 of the concave portion 600a1. Here, the stepped portion refers to a structure resulting from a difference in height from the periphery. The concave portion 600a1 and the convex portion 600a2 are connected by the bending portion 605. The convex portion 600a2 is located at a higher level than the concave portion 600a1. The protrusion portion 110p of the battery cell 110 is protruded toward the stepped portion 600s formed in the first portion 600a11 of the concave portion 600a1.

The frame member 600 of FIGS. 12 and 13 is a modified example of the frame member 300 described in FIG. 5. In addition to the differences described above, all the contents described with reference to FIG. 5 can be applied to the present embodiment. In the case of the frame member 300 described with reference to FIG. 5, the sagging occur in the central portion of the bottom portion 300a with respect to the longitudinal direction of the battery cell 110. Due to such sagging, an air gap is formed between the thermal conductive resin layer 310 and the battery cell 110 of FIG. 2, or an external force resulting from the sagging is applied to the battery cell 110, which may damage the battery cell 110. On the other hand, according to the present embodiment, the second portion 600a12 of the concave portion 600a1 is formed between the convex portions 600a2 adjacent to each other, thereby capable of preventing the sagging along the longitudinal direction of the battery cell 110. In addition, the structural rigidity can be further improved by press-forming the second portion 600a12 of the concave portion 600a1. Further, according to the present embodiment, since the second portion 600a12 of the concave portion 600a1 is formed so as to correspond to the occurrence region of the sagging with respect to the longitudinal direction of the battery cell 110, the effect of preventing sagging and the effect of improving structural rigidity are significant as compared with the frame member 500 described with reference to FIGS. 10 and 11.

FIG. 14 is a perspective view illustrating a frame member according to another embodiment of the present disclosure. FIG. 15 is a plan view of the frame member of FIG. 14.

Referring to FIGS. 2, 14 and 15, the frame member 700 according to the present embodiment includes a bottom portion 700a and two side surface portions 700b facing each other.

The bottom portion 700a of the frame member 700 according to the present embodiment includes a concave portion 700a1 and a convex portion 700a2. The concave portion 700a1 includes a first portion 700a11 located at the edge of the bottom portion 700a, a second portion 700a12 located at the central portion with respect to the longitudinal direction of the battery cell 110, and a third portion 700a13 recessed inside the convex portion 700a2. The third portion 700a12 of the concave portion 700a1 may be formed in the middle of the convex portion 700a2.

The thermal conductive resin layer 310 can be formed so as to cover the convex portion 700a2 and the third portion 700a12 of the concave portion 700a1. In addition, the thermal conductive resin layer 310 may be formed so as to extend to the second portion 700a12 of the concave portion 700a1. Here, the longitudinal direction of the battery cell 110 may be the x-axis direction of FIG. 5. At this time, the thickness of the concave portion 700a1 is equal to the thickness of the convex portion 700a2, and a portion of the bottom portion 700a where the convex portion 700a2 and the concave portion 700a1 are connected is bent, so that a stepped portion 700s can be formed in a region corresponding to the concave portion 700a1. Here, the stepped portion refers to a structure resulting from a difference in height from the periphery. The concave portion 700a1 and the convex portion 700a2 are connected by the bending portion 705. The convex portion 700a2 is located at a higher level than the concave portion 700a1. The protrusion portion 110p of the battery cell 110 is protruded toward the stepped portion 700s formed in the first portion 700a11 of the concave portion 700a1.

The stepped portion 700s can be formed by press-molding the bottom portion 700a of the frame member 700. The battery cell stack 120 is mounted on the bottom portion 700a of the frame member 700, so that the protrusion portion 110p of the battery cell 110 according to the present embodiment is protruded toward the edge with respect to the longitudinal direction of the battery cell 110 among the first portions 700a11 of the bottom portion 700a.

The frame member 700 of FIGS. 14 and 15 is a modified example of the frame member 300 described in FIG. 5. In addition to the differences described above, all the contents described with reference to FIG. 5 may be applied to the present embodiment. In the case of the frame member 300 described with reference to FIG. 5, the sagging may occur in the central portion of the bottom portion 300a with respect to the longitudinal direction of the battery cell 110. Due to such sagging, an air gap is formed between the thermal conductive resin layer 310 and the battery cell 110 of FIG. 2, or external force resulting from the sagging is applied to the battery cell 110, so that the battery cell 110 is likely to be damaged. On the other hand, according to the present embodiment, the second portion 700a12 located at the central portion with respect to the longitudinal direction of the battery cell 110 and the third portion 700a13 recessed inside the convex portion 700a2 are formed, thereby capable of preventing the sagging along the longitudinal direction of the battery cell 110. In addition, the structural rigidity can be improved by press-forming the second portion 700a12 and the third portion 700a13. In addition, according to the present embodiment, the second portion 700a12 of the concave portion 700a1 is formed so as to correspond to the region where the sagging occurs with respect to the longitudinal direction of the battery cell 110. Additionally, since the third portion 700a12 is formed inside the convex portion 700a2, the sagging preventing effect and the structural rigidity improving effect are significantly exhibited, as compared with the frame member 500 described with reference to FIGS. 10 and 11 and the frame member 600 described with reference to FIGS. 12 and 13.

On the other hand, one or more of the battery modules according to the present embodiments can be packaged in a pack case to form a battery pack.

The above-mentioned battery module and battery pack including the same can be applied to various devices. Such a device can be applied to a vehicle means such as an electric bicycle, an electric vehicle, or a hybrid vehicle, but the present disclosure is not limited thereto, and is applicable to various devices capable of using a battery module, which also falls under the scope of the present disclosure.

Although the invention has been shown and described above with reference to the preferred embodiments, the scope of the present disclosure is not limited thereto, and numerous other modifications and improvements made by those skilled in the art using the basic principles of the invention described in the appended claims will fall within the spirit and scope of the present disclosure.

DESCRIPTION OF REFERENCE NUMERALS

100: battery module
300, 500, 600, 700: frame member
300a, 500a, 600a, 700a: bottom portion
300b, 500b, 600b, 700b: side surface portion
300r: undercut shape 310: thermal conductive resin layer
400: upper plate

The invention claimed is:

1. A battery module comprising:
a battery cell stack in which a plurality of battery cells are stacked in a first direction,
a frame member for housing the battery cell stack and having an opened upper portion, and
an upper plate for covering the battery cell stack on an upper portion of the frame member,
wherein a stepped portion is formed at a bottom portion of the frame member,
wherein the stepped portion is formed in each end portion of the bottom portion of the frame member, and
wherein each stepped portion is a depression in the bottom portion of the frame member.

2. The battery module according to claim 1, wherein:
the bottom portion of the frame member includes a first portion and a second portion,
the first portion is located at an edge with respect to the longitudinal direction of the battery cell, and the second portion is located at the inside of the first portion, a portion of the bottom portion to which the second portion and the first portion are connected is bent, and the stepped portion is formed in a region corresponding to the first portion.

3. The battery module according to claim 2, wherein:
each battery cell of the plurality of battery cells comprises a protrusion portion that protrudes into at least one of the stepped portions.

4. The battery module according to claim 3, wherein:
the battery cell stack is mounted on the bottom portion of the frame member so that the protrusion portion of the battery cell protrudes toward the first portion of the bottom portion.

5. The battery module according to claim 3, wherein:
the bottom portion of the frame member comprises an edge portion and a main portion surrounded by the edge portion,
the edge portion includes a first portion located at an edge of the bottom portion based on a second direction, and a second portion located at an edge of the bottom portion based on the first direction, and
the edge portion corresponds to the stepped portion, and the thicknesses of the edge portion and the main portion are equal to each other.

6. The battery module according to claim 5, further comprising a thermal conductive resin layer between the bottom portion of the frame member and the battery cell stack in the region corresponding to the main portion.

7. The battery module according to claim 3, wherein:
the bottom portion of the frame member comprises a concave portion and convex portions,
the concave portion comprises a first portion located at an edge with respect to the second direction, and a second portion located at the central portion with respect to the second direction,
the second portion of the concave portion is located between adjacent convex portions, and
the concave portion corresponds to the stepped portion, and the thicknesses of the concave portion and the convex portions are equal to each other.

8. The battery module according to claim 7, further comprising a thermal conductive resin layer that is located between the bottom portion of the frame member and the battery cell stack in a region corresponding to the convex portions.

9. The battery module according to claim 8, wherein:
the thermal conductive resin layer comprises a first thermal conductive resin layer and a second thermal conductive resin layer that are spaced apart from each other with respect to the second portion of the concave portion.

10. The battery module according to claim 3, wherein:
the bottom portion of the frame member comprises a concave portion and a convex portion,
the concave portion comprises a first portion corresponding to an edge of the bottom portion, a second portion located in the central portion with respect to the longitudinal direction of the battery cell, and a third portion,
the third portion of the concave portion is formed in a middle of the convex portion, and
the concave portion corresponds to the stepped portion, and the thicknesses of the concave portion and the convex portion are equal to each other.

11. The battery module according to claim 10, further comprising a thermal conductive resin layer that is located between the bottom portion of the frame member and the battery cell stack in a region corresponding to the convex portion and the third portion of the concave portion.

12. The battery module according to claim 3, further comprising an insulating sheet located between the stepped portion and the protrusion portion of the battery cell.

13. The battery module according to claim 12, wherein:
the insulating sheet is formed of polyethylene terephthalate (PET).

14. The battery module according to claim 3, wherein:
the protrusion portion is formed in a height direction of the battery cell.

15. The battery module according to claim 1, further comprising end plates coupled to opposite sides of the frame member, respectively,
wherein the opposite sides of the frame member face each other with respect to the first direction.

16. The battery module according to claim 15, wherein:
the frame member further comprises two side surface portions facing each other while being connected by the bottom portion, and
a distance between the two side surface portions is equal to a width of the upper plate.

17. A battery pack comprising the battery module according to claim 16.

18. The battery module according to claim 1, wherein each stepped portion extends under the battery cell stack.

19. The battery module according to claim 1, wherein each stepped portion extends across an entire width in the first direction of the bottom portion of the frame.

20. The battery module according to claim 1, wherein each stepped portion is a reduction in a thickness of the bottom portion of the frame.

* * * * *